United States Patent [19]

Robinson

[11] 3,989,267
[45] Nov. 2, 1976

[54] BOAT LATCH

[76] Inventor: Norman D. Robinson, 2314 Bryan Ave., Salt Lake City, Utah 84108

[22] Filed: Sept. 23, 1974

[21] Appl. No.: 508,068

[52] U.S. Cl. ............................... 280/414 R; 9/1.2; 292/332; 292/335; 214/84
[51] Int. Cl.$^2$ ...................... B62D 3/10; B63C 3/10; B63C 13/00; B66C 13/02
[58] Field of Search ........... 292/335, 332; 105/477, 105/484; 214/84; 280/414 R; 24/230 AL, 230 AN; 9/1 T

[56] References Cited
UNITED STATES PATENTS

| | | | |
|---|---|---|---|
| 633,491 | 9/1899 | Robertson | 292/335 |
| 1,015,640 | 1/1912 | Sallstrom | 292/335 |
| 1,198,862 | 9/1916 | McCormack | 292/335 |
| 1,300,719 | 4/1919 | Gangewere | 292/335 |
| 1,372,923 | 3/1921 | Anderson | 292/335 |
| 2,564,702 | 8/1951 | Linneman | 280/414 R X |
| 2,597,056 | 5/1952 | Beder | 292/335 |
| 2,763,384 | 9/1956 | Foster | 214/84 |
| 2,789,849 | 4/1957 | Hughes | 292/335 X |
| 3,009,589 | 11/1961 | Martz | 214/84 |
| 3,785,677 | 1/1974 | Calkins | 214/84 X |

FOREIGN PATENTS OR APPLICATIONS

| | | | |
|---|---|---|---|
| 648,732 | 1/1951 | United Kingdom | 292/335 |

*Primary Examiner*—Casmir A. Nunberg
*Assistant Examiner*—Carl F. Pietruszka
*Attorney, Agent, or Firm*—B. Deon Criddle

[57] ABSTRACT

A latch arranged to automatically lock a boat to a boat trailer by snapping a latch pin through the bow ring of the boat when the boat is powered onto the trailer. The latch mounts on a trailer stanchion and includes a trigger plate that holds the latch pin cocked and that is moved by the boat to release the latch pin so that it can extend through the bow ring.

13 Claims, 7 Drawing Figures

BOAT LATCH

BRIEF DESCRIPTION OF THE INVENTION

1. Field of the Invention

This invention relates to devices for locking a boat to a boat trailer.

2. Background of the Invention

It has long been common to align a boat with a boat trailer and then to use the drive unit of the boat and a winch attached to the front of the boat to move the boat onto the trailer. If the trailer is equipped with guide rails, it may be a simple job to properly center the boat on the trailer as the boat is moved out of water, but if no such guide rails are provided, several attempts may have to be made before the boat is properly centered. The winch may be locked to snub the bow of the boat to a rubber bow rest and the winch may constitute the only means for holding the boat on the trailer, or other locking devices can also be attached. It is not unusual in the use of the winch that a bow ring to which the winch rope or cable is attached is ripped from the bow of the boat. Also it is not unusual for the person operating the winch to have to wade into the water to assist in guiding the boat onto the trailer and to operate the winch.

SUMMARY OF THE INVENTION

The present invention also provides for locking the bow of a boat to a trailer but does not utilize a winch and does not require that an operator be in the water during a loading or unloading operation. Furthermore it provides a much safer locking than is afforded by use of a winch rope.

Principal objects of the present invention are to provide a latch that can be mounted on a boat trailer such that movement of a boat onto the trailer will automatically actuate the latch to lock the boat to the trailer.

Another object is to provide a latch that can be readily released and locked open during unloading of the boat from the trailer.

Still other objects are to provide a boat latch that is inexpensive to construct, that is durable and that does not include exposed parts that can be damaged by impact of a boat bow against the latch mechanism.

Further objects are to provide a trailer with a latch means arranged such that a boat can be driven thereon and automatically loaded in proper position.

Principal features of the invention include a base that is adapted to be securely mounted on a stanchion at the front end of a properly equipped boat trailer; spaced apart, upstanding, parallel side plates mounted on the base and extending forwardly thereof; a trigger plate pivotally mounted on a pivot shaft extending between the side plates at a lower rear portion thereof; a stop plate fixed between the side plates and arranged to limit downward pivoting of the trigger plate; a locking pin housing surrounding a first hold through one of the side plates and projecting from said side plate away from the trigger plate; a locking pin closely fitting within and adapted to slide in the locking pin housing; a spring in the housing arranged to bias the locking pin from the housing through the first hole and into a second aligned hole formed through the other side plate; and a spring positioned beneath the stop plate and biasing the trigger plate against the stop plate. The trigger plate, stop plate and locking pin are arranged such that when the trigger plate is resting on the stop plate, the trigger plate blocks movement of the locking pin from the locking pin housing.

Other features include locking means to hold the locking pin away from the trigger and retracted into the locking pin housing during unloading of a boat from a trailer on which the boat latch of the invention is used.

Additional objects and features of the invention will become apparent from the following detailed description and drawings disclosing what is presently contemplated as being the best mode of the invention.

THE DRAWINGS

In the drawings:

FIG. 1 is a side-elevation view of a boat trailer equipped to have a boat driven thereon and to be automatically locked in place by the boat latch of the invention;

FIG. 2, a perspective view of the boat latch;

FIG. 3, a vertical sectional view taken on the line 3—3 of FIG. 2;

FIG. 4, a vertical sectional view taken on the line 4—4 of FIG. 2;

FIG. 5, a view like that of FIG. 3, but showing the trigger plate holding the locking pin in the locking pin housing;

FIG. 6, a view like that of FIG. 5, and

FIG. 7, a view like that of FIGS. 3 and 5 but showing the locking pin retracted into and releasably secured to the locking pin housing.

DETAILED DESCRIPTION

Figure 1:
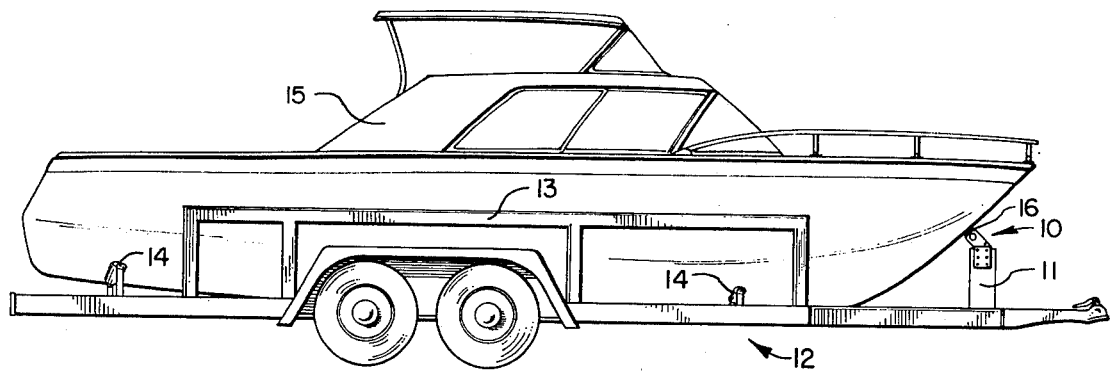

Referring now to the drawings:

In the illustrated preferred embodiment, the boat latch of the invention, shown generally at 10 in FIG. 1, is mounted on the top of a stanchion 11 located at the front end of a conventional boat trailer 12.

The boat trailer has raised side rails 13 at each side thereof to guide a boat into a centered position on transversely extending rollers 14 that are spaced along the length of the trailer. Trailers equipped with such side rails and rollers are well known, and it is not deemed necessary herein to disclose the mounting details of these structures.

As shown in FIG. 1, when a boat 15 is properly positioned on the trailer 12 the boat is between the rails 13, is centered on the rollers 14 and has the bow ring 16 of the boat locked to the stanchion 11 by the boat latch 10.

Boat latch 10 includes a generally U-shaped base plate 17, having spaced-apart legs 17a interconnected by a web 17b. The legs 17a are adapted to straddle the top of the port forming stanchion 11 and pairs of aligned holes are formed through the legs and the stanchion so that bolts 18 can be inserted therethrough to receive nuts 19 and to thereby secure the boat latch to the stanchion. Preferably, more than one set of bolts can be used to secure the boat latch or so that the boat latch can be adjusted up or down on the stanchion to be properly aligned with the bow ring of a boat carried on the trailer. As shown in FIG. 1, the boat latch 10 is set fully down on the stanchion 11 and all bolts 18 and nuts 19 are used. It will be apparent, however, that only one set of bolts is necessary; and that, although the others provide further locking, they are optional and will not be used if the boat lock is raised and the holes, therefore, through the legs 17a are no longer aligned with holes through the stanchion 11.

Spaced-apart side plates 20 and 21 are mounted to the web 17b and project upwardly therefrom and outwardly such that when the boat latch is mounted on the stanchion, the side plates extend in the direction of a boat on the trailer. Aligned holes 22 and 23 are provided through the side plates 20 and 21, respectively; and a tubular housing 24 surrounds hole 22 at one side of plate 20 and extends outwardly from the plate.

Figure 3:
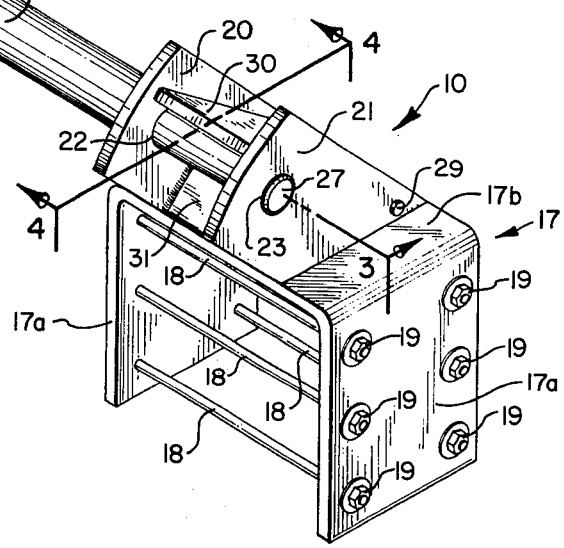
Figure 3:
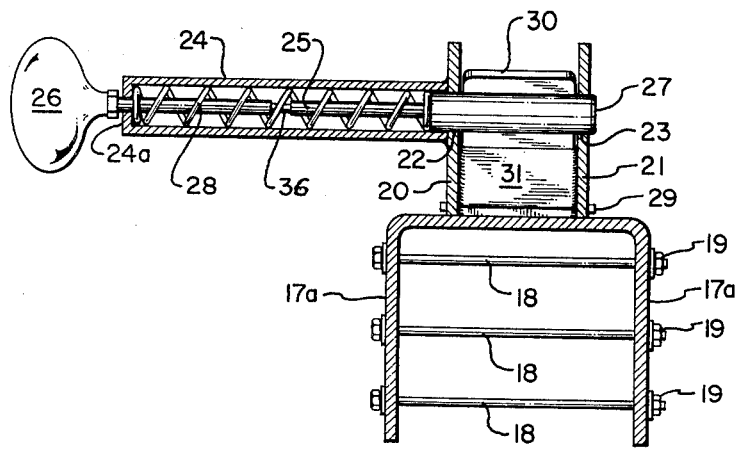

A rod 25 (FIG. 3) extends slidably through a rear wall 24a of housing 24 and an enlarged handle 26 is fixed to the rod 25, outside the housing 24. The other end of rod 25 has an elongate locking pin 27 fixed thereto. The locking pin is long enough to simultaneously fit through the holes 22 and 23 and to partially extend into the housing 24. Pin 27 is larger than the rod 25, so that a spring 28 surrounding rod 25 and positioned between the end wall 24a and the locking pin 27, will expand within housing 24 to position the locking pin to extend through both holes 22 and 23.

A pivot pin 29 extends through plates 20 and 21 at a position just above the base plate 17 and a trigger plate 30 is fixed to the pivot pin and swings closely between the plate 20 and 21.

Figure 2:
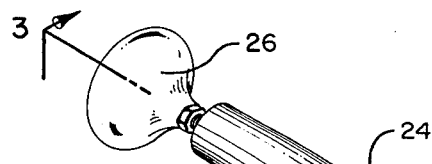
Figure 4:
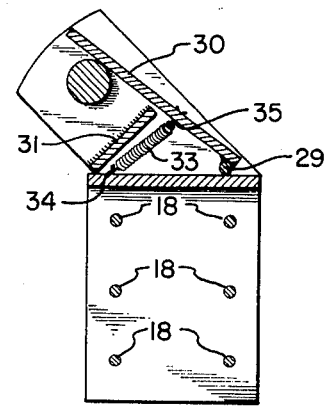

A stop plate 31 is fixed to the top of the base plate and to the side plates and extends upwardly and rearwardly beneath the trigger plate. The locking pin 27 and trigger plate are arranged such that when the locking pin is biased by spring 28 to extend through both of the holes 22 and 23 the trigger plate will pivot into a position resting on and extending angularly upwardly and slightly beyond the locking pin, as shown best in FIGS. 2–4.

A spring 33, anchored at 34 to the base plate between the stop plate 31 and the pivot pin 29, is connected to the trigger plate at 35. Spring 33 acts to bias the trigger plate against the locking pin 27 when the locking pin is extending through the holes 22 and 23 and against the stop plate 31, when the locking pin is withdrawn into housing 24, as will be further explained.

The stop plate 31 is angled from bottom to top in the direction of travel of a boat approaching the boat latch and will help to direct a bow ring into position to be secured by the locking pin, as will be hereafter described. In addition, the stop plate protects the spring 33 against damage from an oncoming boat.

Figure 5:
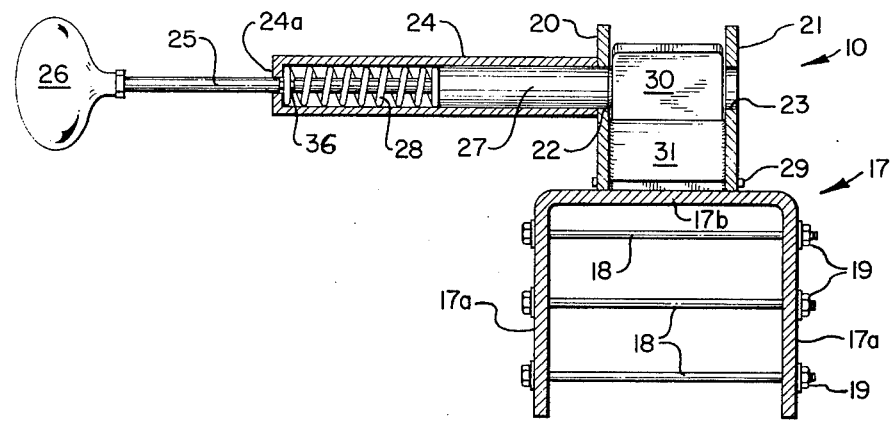
Figure 6:
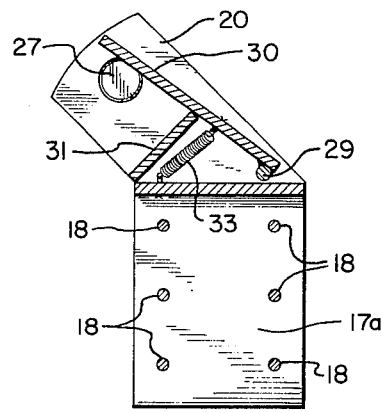
Figure 7:
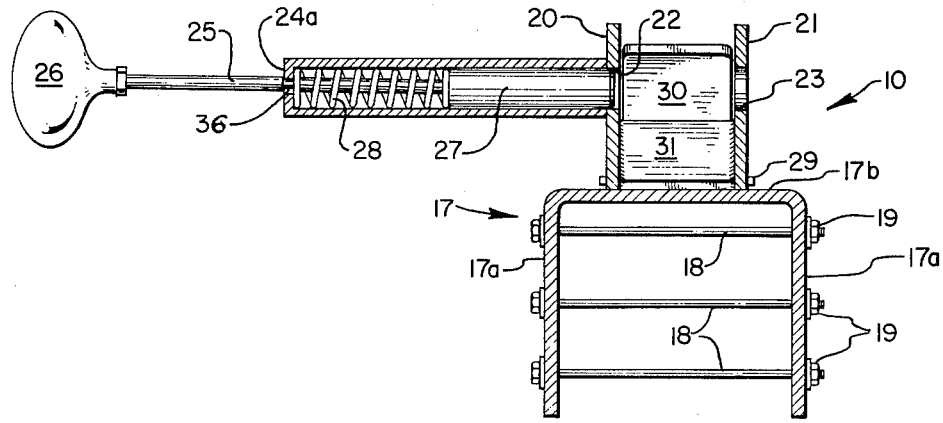

In operation, the boat latch is set to a cocked position by grasping handle 26 and pulling the rod 25 out through the rear wall 24a while compressing the spring 28. As soon as the top of the locking pin 27 is pulled into hole 22, the trigger plate 30 is biased by spring 33 to a position resting on stop plate 31. As shown best in FIGS. 5 and 6, release of the handle 26 by the operator will allow spring 28 to bias the locking pin against an edge of trigger plate 30 but the trigger plate will then block further travel of the locking pin, and the boat latch is in a cocked position.

With the boat latch 10 on the stanchion 11 and in the cocked position, the trailer 12 is ready to have the boat 15 driven thereon. The boat is powered onto the trailer (the trailer being properly positioned in the water to receive the boat) until the bow ring 16 of the boat engages the trigger plate 30 to pivot it off the stop plate 31 against the bias of spring 33. This movement of the trigger plate allows spring 28 to bias the locking pin 27 through the bow ring and through hole 23 to securely lock the boat to the boat latch. The inclined stop plate helps to guide the bow ring into position to receive the locking pin and, protects the spring 33 from being hit by the oncoming boat.

During unloading of the boat from the trailer the handle 26 is grasped to pull the locking pin 27 fully into housing 24. The rod 25 is then canted until a shoulder of a notch 36 on the rod engages rear wall 24a and the rod is held in place by the compressed spring 28. The boat is then moved off the trailer and the trigger plate 30, which has been resting against the bow ring, will be biased to its position resting on stop plate 31. A slight touch on the handle 26 will then release notch 36 from rear wall 24a and will move the locking pin to the cocked position against the edge of the locking plate. The boat latch is then in position to again receive the bow ring of a boat being loaded.

Although a preferred form of my invention has been herein disclosed, it is to be understood that such disclosure is by way of example, and that variations are possible without departing from the subject matter coming within the scope of the following claims, which subject matter I regard as my invention.

I claim:

1. A boat latch for securing a boat or the like having a bow ring to a trailer, comprising
   a base plate;
   means for mounting the base plate to a trailer;
   a pair of spaced-apart side plates fixed to and extending upwardly and in a forwardly direction of the base plate, said side plates having aligned holes therethrough, and said holes being above and forwardly of the base plate;
   an elongate housing fixed to one of said side plates and extending outwardly therefrom, said housing having a rear wall remote from the side wall and an opening therethrough;
   a rod extending into the housing through the opening in the rear wall thereof, said rod having a handle on the end thereof outside said housing and a locking pin on the other end thereof;
   means biasing the locking pin through the side plate to which the housing is affixed and into the aligned hole through the other side plate;
   a trigger plate; and
   means mounting the trigger plate between the side plates to be moved by the bow of a boat between a first position blocking movement of the locking pin into the aligned hole in the other side plate and a second position wherein said locking pin can be biased through the bow ring of a boat into the aligned hole in the other side plate, said means comprising a pivot shaft to which the trigger plate is connected, said pivot shaft being pivotally connected to the side plates, and a stop plate fixed with respect to said side plates and adapted to have the trigger plate rest thereon with the trigger plate extending between the holes in the side plates to thereby block movement of the locking pin.

2. A boat latch as in claim 1, further including means biasing the trigger plate from its second position to its first position.

3. A boat latch as in claim 2, wherein the means biasing the trigger plate from its second position to its first position comprises a spring.

4. A boat latch as in claim 3, wherein the spring biasing the trigger plate is connected between the trigger plate and the base.

5. A boat latch as in claim 1, wherein the locking pin is larger than the rod and is sufficiently long to extend through both side plates and into the housing.

6. A boat latch as in claim 5, wherein the means biasing the locking pin through the side plate to which the housing is affixed and into the aligned hole through the other side plate comprises
   a spring in the housing, said spring surrounding the rod and being positioned between an end of the housing and the locking pin.

7. A boat latch as in claim 6, further including
   means for latching the locking pin in the housing against the bias of the spring.

8. A boat latch as in claim 7, wherein the means for latching the locking pin comprises
   a notch in the rod, adapted to engage a portion of the rear wall of the housing through which the rod extends.

9. A boat latch as in claim 1, further including
   means for latching the locking pin in the housing.

10. A boat latch as in claim 9, wherein the means for latching the locking pin comprises
    a notch in the rod, adapted to engage a portion of the rear wall of the housing through which the rod extends.

11. A boat latch as in claim 1, further including
    means biasing the trigger plate from its second position to its first position.

12. A boat latch as in claim 11, wherein
    the spring biasing the trigger plate is positioned between the stop plate and the trigger plate.

13. A boat latch as in claim 11, wherein
    the means biasing the trigger plate from its second position to its first position comprises a spring.

* * * * *